United States Patent
Sun et al.

(10) Patent No.: US 11,610,345 B2
(45) Date of Patent: Mar. 21, 2023

(54) METHOD AND SYSTEM OF QUANTITATIVE INTRAVASCULAR OPTICAL COHERENCE TOMOGRAPHY

(71) Applicant: NORTH CHINA ELECTRIC POWER UNIVERSITY (BAODING), Baoding (CN)

(72) Inventors: Zheng Sun, Baoding (CN); Fei Yang, Baoding (CN)

(73) Assignee: NORTH CHINA ELECTRIC POWER UNIVERSITY (BAODING), Baoding (CN)

( * ) Notice: Subject to any disclaimer, the term of this patent is extended or adjusted under 35 U.S.C. 154(b) by 238 days.

(21) Appl. No.: 17/143,419

(22) Filed: Jan. 7, 2021

(65) Prior Publication Data

US 2022/0139001 A1    May 5, 2022

(30) Foreign Application Priority Data

Nov. 3, 2020  (CN) .......................... 202011211100.0

(51) Int. Cl.
 G06T 11/00   (2006.01)
 G06T 7/00    (2017.01)

(52) U.S. Cl.
 CPC .......... G06T 11/005 (2013.01); G06T 7/0012 (2013.01); G06T 11/008 (2013.01); *G06T 2207/10101* (2013.01); *G06T 2207/30101* (2013.01)

(58) Field of Classification Search
 None
 See application file for complete search history.

(56) References Cited

U.S. PATENT DOCUMENTS

2017/0193658 A1*  7/2017  Cardinal ................. A61B 8/12
2019/0059721 A1*  2/2019  Ono ..................... A61B 3/0025

* cited by examiner

*Primary Examiner* — Vu Le
*Assistant Examiner* — Courtney Joan Nelson
(74) *Attorney, Agent, or Firm* — Bacon & Thomas, PLLC (57) ABSTRACT

The present disclosure relates to a method and a system of quantitative intravascular optical coherence tomography. The method includes: acquiring and graying an intravascular optical coherence tomography cross-sectional image, and converting it into a polar coordinate view; calculating a confocal function value and a sensitivity function value according to parameters of the imaging system; establishing a model of an intensity of a backscattered signal being attenuated depending on the detection depth, according to the confocal function value and the sensitivity function value to obtain a theoretical value of the backscattered signal; determining a measured value of the backscattered signal; constructing an error function according to the theoretical value and the corresponding measured value; minimizing the error function to determine a light attenuation coefficient corresponding to each polar coordinate; and determining a spatial distribution diagram of the light attenuation coefficient according to the light attenuation coefficient corresponding to each polar coordinate.

7 Claims, 4 Drawing Sheets

METHOD AND SYSTEM OF QUANTITATIVE INTRAVASCULAR OPTICAL COHERENCE TOMOGRAPHY

CROSS REFERENCE TO RELATED APPLICATION

This application claims the benefit of Chinese Patent Application No. 202011211100.0, entitled "Method and System of Quantitative Intravascular Optical Coherence Tomography" filed with the China National Intellectual Property Administration on Nov. 3, 2020, which is incorporated herein by reference in its entirety.

TECHNICAL FIELD

The present disclosure relates to a technical field of medical imaging, in particular to a method and a system of quantitative intravascular optical coherence tomography.

BACKGROUND

Intravascular optical coherence tomography (IVOCT) has advantages of high image acquisition speed, high resolution (an axial resolution and a lateral resolution can be up to 10 micrometers and 25 micrometers respectively), high signal-to-noise ratio and the like, and at present is an intravascular imaging technology with the highest resolution. An intravascular coherence tomography image can clearly show a lesion in a vascular lumen and under a vascular wall intima, and therefore it is easy to identify atherosclerotic plaques and small plaques causing thrombus. However, in an early stage of lesion, there is little difference in light scattering characteristics between a normal time and a lesion tissue. For a deeper tissue, the lesion cannot be accurately distinguished only based on a tomography image of a tissue structure, and a physiological information contrast mechanism, in addition to a morphological structure, is required to obtain tissue optical characteristic parameters with clinical diagnosis value. Calculation during this process is complicated, a spatial distribution of a light attenuation coefficient of a tissue on a cross section of a blood vessel cannot be quantitatively and accurately estimated, and a capability to identify different tissue components needs to be improved.

SUMMARY

The present disclosure intends to provide a method and a system of quantitative intravascular optical coherence tomography, which can quantitatively estimate a spatial distribution of a light attenuation coefficient of a tissue on a cross section of a blood vessel with a standard cross-sectional mag output by an imaging system, to improve a capability to identify different tissue components.

In order to achieve the above effect, the present disclosure provides the following solutions:

A method of quantitative intravascular optical coherence tomography, comprising:

acquiring an intravascular optical coherence tomography cross-sectional image output by an imaging system; wherein, the intravascular optical coherence tomography cross-sectional image is a transvers view; a center of the intravascular optical coherence tomography crossectional image corresponds to a center of an imaging catheter, and a vascular lumen, a vascular wall intima/media and a vascular wall adventitia are around the center of the image in sequence;

graying the intravascular optical coherence tomography cross-sectional image, and converting the grayed intravascular optical coherence tomography cross-sectional image into a polar coordinate view;

respectively calculating a confocal function value and a sensitivity function value of each polar coordinate in the polar coordinate view according to parameters of the imaging system; wherein, the parameters of the imaging system comprise: a center wavelength of an incident light, a resolution of a spectrometer, and a wavelength interval;

establishing a model of an intensity of a backscattered signal being attenuated depending on a detection depth, according to the confocal function value and the sensitivity function value of each polar coordinate to obtain a theoretical value of the backscattered signal;

determining a measured value of the backscattered signal according to a gray value of each pixel in the grayed intravascular optical coherence tomography cross-sectional image;

constructing an error function according to the theoretical value of the backscattered signal and the measured value of the backscattered signal corresponding to each polar coordinate;

minimizing the error function to determine a light attenuation coefficient corresponding to each polar coordinate in the polar coordinate view; and determining a spatial distribution diagram of the light attenuation coefficient according to the light attenuation coefficient corresponding to each polar coordinate in the polar coordinate view.

Optionally, graying the intravascular optical coherence tomography cross-sectional image, and converting the grayed intravascular optical coherence tomography crowssectional image into the polar coordinate view comprises:

graying the intravascular optical coherence tomography cross-sectional image to determine the grayed intravascular optical coherence tomography cross-sectional image;

establishing an XOY rectangular coordinate system with a center of the imaging catheter as a coordinate origin O, the horizontal right direction as a positive direction of an X-axis, and an upward vertical direction as a positive direction of a Y-axis, according to the grayed intravascular optical coherence tomography cross-sectional image;

establishing a θ-l polar coordinate system with O as a coordinate origin according to the XOY rectangular coordinate system, and converting the grayed intravascular optical coherence tomography cross-sectional image into a polar coordinate view; wherein θ is a polar angle, l is a polar diameter, l-axis is a radial thickness of a multilayered vascular wall tissue, and a surface of the vascular wall is parallel to θ-axis and perpendicular to the l-axis.

Optionally, respectively calculating the confocal function value and the sensitivity function value of each polar coordinate in the polar coordinate view according to the parameters of the imaging system comprises:

determining the confocal function value at a polar coordinate $(θ_i, m)$ by using a formula:

$$h(θ_i, m) = \int_{m\Delta}^{(m+1)\Delta} \left\{ \left[ \frac{\lambda_0(z-z_0)}{\alpha_R n \pi w_0^2} \right]^2 + 1 \right\}^{-1} dz;$$

determining the sensitivity function value at the polar coordinate ($\theta_i$, m) by using a formula:

$$f(\theta_i, m) = \int_{m\Delta}^{(m+1)\Delta} \left[ \left( \frac{\sin\zeta}{\zeta} \right)^2 \exp\left( -\frac{\delta\lambda/\Delta\lambda}{2\ln 2} \zeta^2 \right) \right] dz;$$

wherein, $h(\theta_i, m)$ is the confocal function value at the polar coordinate ($\theta_i$, m), $f(\theta_i, m)$ is the sensitivity function value at the polar coordinate ($\theta_i$, m), $\theta_i \in [0, 2\pi]$, m=0, 1, ..., M, M is a radius (unit: pixel) of a frame of the intravascular optical coherence tomography cross-sectional image, $\Delta$ is a size (unit: mm) of the pixel in the image, $\alpha_R$ is a derivative parameter of a secondary laser beam formed by an interaction of an incident beam with scatterers in a medium ($\alpha_R=1$ for a specular reflection; and $\alpha_R=2$ for a diffuse reflection), n is a refractive index of a tissue to light, $z_0$ is a focal plane position ($z_0$ is negative when the focal plane is above the tissue, $z_0$ is positive when the focal plane is inside the tissue), $w_0$ is a light spot radius after the incident light is focused, $\lambda_0$ is the center wavelength of the incident light, $\delta\lambda$ is the resolution of the spectrometer, $\Delta\lambda$ is the wavelength interval, $\lambda_0$, $\delta\lambda$ and $\Delta\lambda$ are the parameters of the imaging system, $\zeta$ is a normalized value of a depth z with respect to a maximum detection depth, wherein, $$\zeta = 2\pi z \frac{\Delta\lambda}{\lambda_0^2}.$$

Optionally, establishing the model of the intensity of the backscattered signal being attenuated depending on the detection depth, according to the confocal function value and the sensitivity function value of each polar coordinate to obtain the theoretical value of the backscattered signal comprises:

determining an irradiance of the incident light at the polar coordinate ($\theta_i$, m) by using a formula:

$$L_{fh}(\theta_i, m) = L_0 f(\theta_i, m) h(\theta_i, m) \exp\left[ -\Delta \sum_{i=0}^{m} \mu_t(\theta_i, l) \right];$$

determining an irradiance of the backscattered light at the polar coordinate ($\theta_i$, m) by using a formula:

$$B(\theta_i, m) =$$
$$\alpha \mu_t(\theta_i, m) L_{fh}(\theta_i, m) = \alpha \mu_t(\theta_i, m) L_0 f(\theta_i, m) h(\theta_i, m) \exp\left[ -\Delta \sum_{l=0}^{m} \mu_t(\theta_i, l) \right];$$

determining an irradiance of the backscattered light reaching a detector surface at the polar coordinate ($\theta_i$, m) by using a formula:

$$A(\theta_i, m) = B(\theta_i, m) \exp\left[ -\Delta \sum_{l=0}^{m} \mu_t(\theta_i, l) \right] =$$
$$\alpha \mu_t(\theta_i, m) L_0 f(\theta_i, m) h(\theta_i, m) \exp\left[ -2\Delta \sum_{l=0}^{m} \mu_t(\theta_i, l) \right];$$

determining the theoretical value of the backscattered signal at the polar coordinate ($\theta_i$, m) by using a formula:

$$I_b(\theta_i, m) = n(\theta_i, m) + \beta A(\theta_i, m)$$
$$= n(\theta_i, m) + \beta \alpha \mu_t(\theta_i, m) L_0 f(\theta_i, m) h(\theta_i, m)$$
$$\exp\left[ -2\Delta \sum_{i=0}^{m} \mu_t(\theta_i, l) \right];$$

wherein. $L_{fh}(\theta_i, m)$ is the irradiance of the incident light at the polar coordinate ($\theta_i$, m) in an imaging plane, $L_0$ is an incident light power (unit: mW or dBm), $\mu_t(\theta_i, l)$ is a tissue light attenuation coefficient at the polar coordinate ($\theta_i$, l), $B(\theta_i, m)$ is the irradiance of the backscattered light at the polar coordinate ($\theta_i$, m), $\alpha$ is a proportion of the backscattered light in the incident light, $A(\theta_i, m)$ is the irradiance of the backscattered light reaching the detector surface at the polar coordinate ($\theta_i$, m), $I_b(\theta_i, m)$ is the theoretical value of the backscattered signal at the polar coordinate ($\theta_i$, m), $n(\theta_i, m)$ is a noise power value introduced by measurement at the polar coordinate ($\theta_i$, n), and $\beta$ is an A/D conversion factor of the imaging system.

Optionally, determining the measured value of the backscattered signal according to the gray value of each pixel in the grayed intravascular optical coherence tomography cross-sectional image comprises:

determining a normalized measured value of the backscattered signal at a polar coordinate ($\theta_i$, m) by using a formula:

$$I_m(\theta_i, m) = \frac{g(\theta_i, m)}{255};$$

wherein, $g(\theta_i, m)$ is a gray value at the polar coordinate ($\theta_i$, m) in the polar coordinate view of an intravascular optical coherence tomography image, and $I_m(\theta_i, m)$ is the normalized measured value of the backscattered signal at the polar coordinate ($\theta_i$, m).

Optionally, constructing the error function according to the theoretical value of the backscattered signal and the measured value of the backscattered signal corresponding to each polar coordinate comprise:

determining the error function by using a formula:

$$f(\mu_t(\theta_i, m)) = \bar{I}_b(\theta_i, m) - I_m(\theta_i, m);$$

wherein, $f(\cdot)$ is the error function, $\bar{I}_b(\theta_i, m)$ is a normalized theoretical value of the backscattered signal at a polar coordinates ($\theta_i$, m).

Optionally, minimizing the error function to determine the light attenuation coefficient corresponding to each polar coordinate in the polar coordinate view comprises:

determining an estimated value of the light attenuation coefficient by using a formula:

$$\hat{\mu}_t(\theta_i, m) = \operatorname*{argmin}_{\mu \geq 0} F(\mu) = \operatorname*{argmin}_{\mu \geq 0} \|f(\mu)\|^2;$$

performing Taylor expansion approximation on an objective function $F(\mu)$ near $\mu$ by using a formula:

$$F(\mu + \Delta\mu) = \|f(\mu + \Delta\mu)\|^2 \approx \|f(\mu)\|^2 + f'(\mu)\Delta\mu + \tfrac{1}{2} f''(\mu)(\Delta\mu)^2;$$

converting an optimization problem of the an estimated value of the light attenuation coefficient into solving an optimal increment Δμ for each iteration by using a formula as follows, and adding a damping term to punish Δμ:

$$\begin{cases} \Delta\hat{\mu} = \underset{\Delta\mu}{\arg\min}\, m(\Delta\mu) \\ m(\Delta\mu) = \|f(\mu)\|^2 + f'(\mu)\Delta\mu + \frac{1}{2}f''(\mu)(\Delta\mu)^2 + \frac{1}{2}\gamma(\Delta\mu)^2 \end{cases};$$

and
solving a formula:

$$\begin{cases} \Delta\hat{\mu} = \underset{\Delta\mu}{\arg\min}\, m(\Delta\mu) \\ m(\Delta\mu) = \|f(\mu)\|^2 + f'(\mu)\Delta\mu + \frac{1}{2}f''(\mu)(\Delta\mu)^2 + \frac{1}{2}\gamma(\Delta\mu)^2 \end{cases},$$

to determine the light attenuation coefficient corresponding to each polar coordinate in the polar coordinate;

wherein, F(μ) is the objective function, $\hat{\mu}_t(\theta_t, m)$ is the estimated value of the light attenuation coefficient, f'(μ) and f''(μ) are the first and second derivatives of f(μ) respectively.

A system of quantitative intravascular optical coherence tomography, comprising: an acquisition module for intravascular optical coherence tomography cross-sectional image, configured to acquire an intravascular optical coherence tomography cross-sectional image output by an imaging system; wherein, the intravascular optical coherence tomography cross-sectional image is a transverse view; a center of the intravascular optical coherence tomography cross-sectional image corresponds to a center of an imaging catheter, and a vascular lumen, a vascular wall intima/media and a vascular wall adventitia are around the center of the image in sequence;

a determination module for a polar coordinate view, configured to gray the intravascular optical coherence tomography cross-sectional image, and convert the grayed intravascular optical coherence tomography cross-sectional image into a polar coordinate view;

a determination module for a confocal function value and a sensitivity function value, configured to respectively calculate the confocal function value and the sensitivity function value of each polar coordinate in the polar coordinate view according to parameters of the imaging system; wherein, the parameters of the imaging system comprise: a center wavelength of an incident light, a resolution of a spectrometer, and a wavelength interval;

a determination module for a theoretical value of the backscattered signal, configured to establish a model of the intensity of the backscattered signal being attenuated depending on a detection depth, according to the confocal function value and the sensitivity function value of each polar coordinate to obtain the theoretical value of the backscattered signal;

a determination module for a measured value of the backscattered signal, configured to determine the measured value of the backscattered signal according to a gray value of each pixel in the grayed intravascular optical coherence tomography cross-sectional image;

an error function constructing module, configured to construct an error function according to the theoretical value of the backscattered signal and the measured value of the backscattered signal corresponding to each polar coordinate;

a determination module for a light attenuation coefficient, configured to minimize the error function to determine the light attenuation coefficient corresponding to each polar coordinate in the polar coordinate view; and a determination module for a spatial distribution diagram of the light attenuation coefficient, configured to determine the spatial distribution diagram of the light attenuation coefficient according to the light attenuation coefficient corresponding to each polar coordinate in the polar coordinate view.

According to specific embodiments provided by the present disclosure, the technical effects of the present disclosure are as follows:

The present disclosure provides a method and a system of quantitative intravascular optical coherence tomography. In the embodiments provided by the disclosure, the intravascular optical coherence tomography cross-sectional image is grayed, and the grayed intravascular optical coherence tomography cross-sectional image is converted into a polar coordinate view; then a confocal function value and a sensitivity function value of each polar coordinate in the polar coordinate view are respectively calculated according to parameters of the imaging system, and then a model of an intensity of a backscattered signal being attenuated depending on a detection depth is established according to the confocal function value and the sensitivity function value of each polar coordinate to obtain a theoretical value of the backscattered signal. Next, a measured value of the backscattered signal is determined according to a gray value of each pixel in the grayed intravascular optical coherence tomography cross-sectional image. Finally, by minimizing an error between the theoretical value and the measured value of the backscattered signal, a light attenuation coefficient of a tissue on a cross section of a blood vessel is estimated to obtain a spatial distribution diagram of the light attenuation coefficient. The method and the system of quantitative intravascular optical coherence tomography provided by the present disclosure can quantitatively estimate a spatial distribution of a light attenuation coefficient of a tissue on a cross section of a blood vessel with a standard cross-sectional image output by an imaging system, to improve a capability to identify different tissue components.

BRIEF DESCRIPTION OF THE DRAWINGS

In order to more clearly illustrate embodiments of the present disclosure or technical solutions in the conventional technology, accompanying drawings used in the embodiments will now be described briefly. It is obvious that the drawings in the following description are only some embodiments of the present disclosure, and that those skilled in the art can obtain other drawings from these drawings without involving any inventive effort.

DETAILED DESCRIPTION OF THE EMBODIMENTS

In the following technical solutions in the embodiments of the present disclosure will be clearly and completely described with reference to the drawings in the embodiments of the present disclosure. Obviously, the described embodiments are only a part of the embodiments of the present disclosure, but not all the embodiments. Based on the embodiments of the present disclosure, all other embodiments obtained by a person of ordinary skill in the art without involving any inventive effort are within the scope of the present disclosure.

The present disclosure intends to provide a method and a system of quantitative intravascular optical coherence tomography, which can quantitatively estimate a spatial distribution of a light attenuation coefficient of a tissue on a cross section of a blood vessel with a standard cross-sectional image output by an imaging system, to improve a capability to identify different tissue components.

To further clarify the above objects, features and advantages of the present disclosure, a more particular description of the disclosure will be rendered by reference to the accompanying drawings and specific embodiments thereof.

Figure 1:
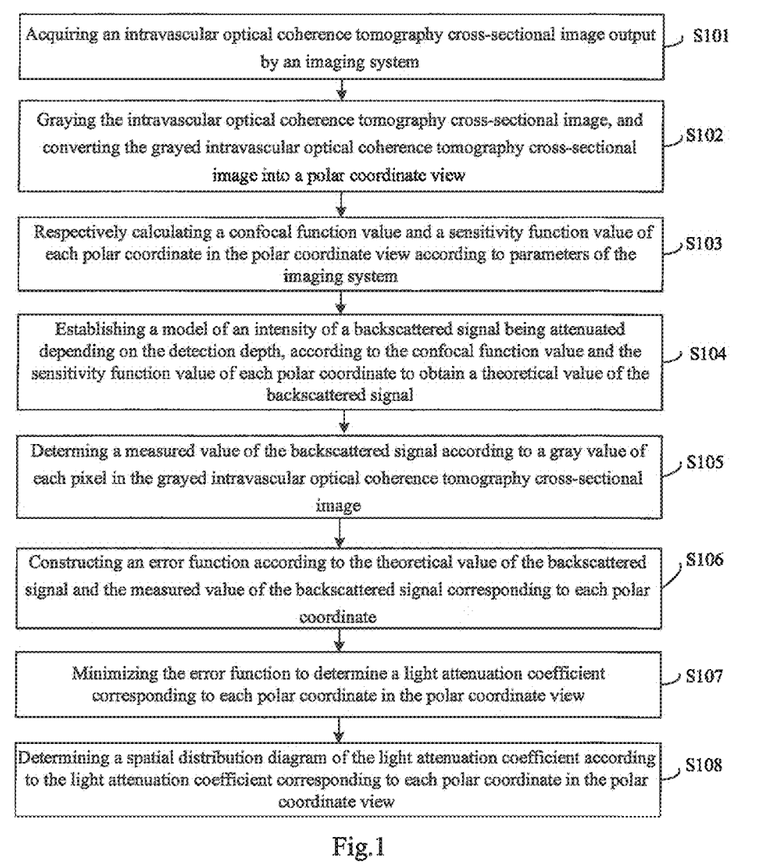
FIG. 1 is a schematic flow chart of a method of quantitative intravascular optical coherence tomography provided by the present disclosure.

FIG. 1 is a schematic flow chart of a method of quantitative intravascular optical coherence tomography provided by the present disclosure. As shown in FIG. 1, the method of quantitative intravascular optical coherence tomography provided by the present disclosure may include the following steps S101 to S108.

Figure 2:
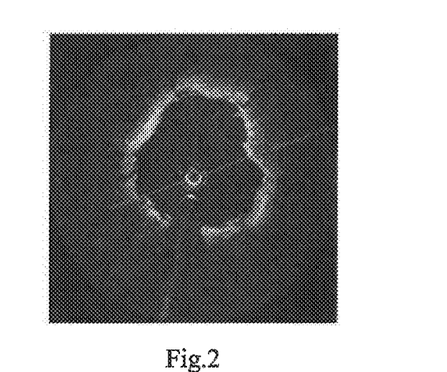
FIG. 2 is an intravascular optical coherence tomography grayscale image.

S101, an intravascular optical coherence tomography cross-sectional image output by an imaging system is acquired. Wherein, the intravascular optical coherence tomography cross-sectional image is a transverse view; a center of the intravascular optical coherence tomography cross-sectional image corresponds to a center of an imaging catheter, and a vascular lumen, a vascular wall intima/media and a vascular wall adventitia are around the cuter of the image in sequence, as shown in FIG. 2.

S102, the intravascular optical coherence tomography cross-sectional image is grayed, and the grayed intravascular optical coherence tomography cross-sectional image is converted into a polar coordinate view.

Step S102 specifically includes:
graying the intravascular optical coherence tomography cross-sectional image to determine the grayed intravascular optical coherence tomography cross-sectional image.

Figure 3:
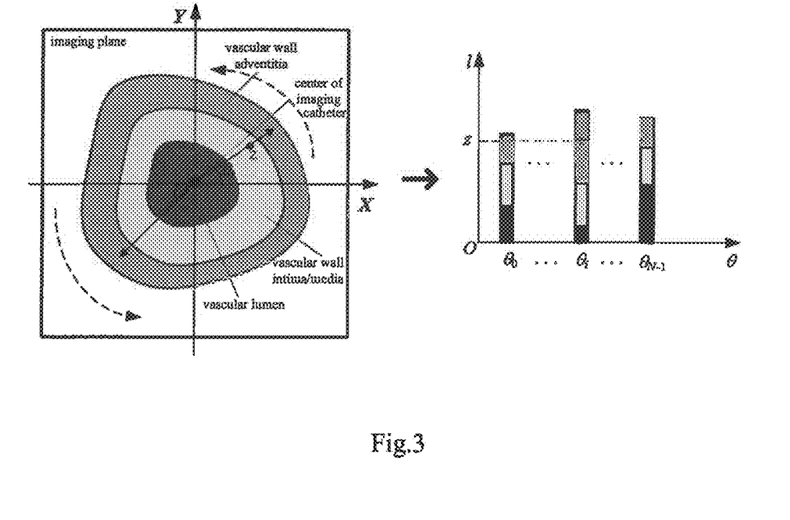
FIG. 3 is a schematic diagram of a cross section of a blood vessel in an intravascular coherence tomography image.

As shown in FIG. 3, an XOY rectangular coordinate system, with a center of the imaging catheter as a coordinate origin O, the horizontal right direction as a positive direction of an X-axis, and an upward vertical direction as a positive direction of a Y-axis, is established according to the grayed intravascular optical coherence tomography cross-sectional image.

A θ-l polar coordinate system with O as a coordinate origin is established according to the XOY rectangular coordinate system, and the grayed intravascular optical coherence tomography cross-sectional image is convened into a polar coordinate view. Wherein θ is a polar angle, l is a polar diameter, l-axis is a radial thickness of a multilayered vascular wall tissue, and a surface of the vascular wall is parallel to θ-axis and perpendicular to the l-axis.

S103, a confocal function value and a sensitivity function value of each polar coordinate in the polar coordinate view are respectively calculated according to parameters of the imaging system. Wherein, the parameters of the imaging system comprise: a center wavelength of an incident light, a resolution of a spectrometer, and a wavelength interval;

Step S103 specifically includes:
determining the confocal function value at a polar coordinate ($\theta_i$, m) by using a formula:

$$h(\theta_i, m) = \int_{m\Delta}^{(m+1)\Delta} \left\{ \left[ \frac{\lambda_0(z-z_0)}{\alpha_R n \pi w_0^2} \right]^2 + 1 \right\}^{-1} dz;$$

and
determining the sensitivity function value at the polar coordinate ($\theta_i$, m) by using a formula:

$$f(\theta_i, m) = \int_{m\Delta}^{(m+1)\Delta} \left[ \left( \frac{\sin\zeta}{\zeta} \right)^2 \exp\left( -\frac{\delta\lambda/\Delta\lambda}{2\ln 2} \zeta^2 \right) \right] dz.$$

Wherein, $h(\theta_i, m)$ is the confocal function value at the polar coordinate ($\theta_i$, m), $f(\theta_i, m)$ is the sensitivity function value at the polar coordinate ($\theta_i$, m), $\theta_i \in [0, 2\pi]$, m=0, 1, ..., M, M is a radius (unit: pixel) of a frame of the intravascular optical coherence tomography cross-sectional image, $\Delta$ is a size (unit: mm) of the pixel in the image, $\alpha_R$ is a derivative parameter of a secondary laser beam formed by an interaction of an incident beam with scatterers in a medium ($\alpha_R$=1 for a specular reflection; $\alpha_R$=2 for a diffuse reflection), n is a refractive index of a tissue to light, $z_0$ is a focal plane position ($z_0$ is negative when the focal plane is above the tissue, and $z_0$ is positive when the focal plane is inside the tissue), $w_0$ is a light spot radius after the incident light is focused, $\lambda 0$ is the center wavelength of the incident light, $\delta\lambda$ is the resolution of the spectrometer, $\Delta\lambda$ is the wavelength interval, $\lambda_0$, $\delta\lambda$ and $\Delta\lambda$ are the parameters of the imaging system, and $\zeta$ is a normalized value of a depth z with respect to a maximum detection depth, $$\zeta = 2\pi z \frac{\Delta\lambda}{\lambda_0^2}.$$

S104, a model of an intensity of a backscattered signal being attenuated depending on a detection depth is established according to the confocal function value and the sensitivity function value of each polar coordinate to obtain a theoretical value of the backscattered signal.

Step S104 specifically includes the following steps S1041-1044:

S1041: an irradiance of the incident light at the polar coordinate ($\theta_i$, M) is determined by using a formula:

$$L_{fh}(\theta_i, m) = L_0 f(\theta_i, m) h(\theta_i, m) \exp\left[ -\Delta \sum_{l=0}^{m} \mu_t(\theta_i, l) \right].$$

S1042: an irradiance of the backscattered light at the polar coordinate ($\theta_i$, m) is determined by using a formula:

$$B(\theta_i, m) = \alpha \mu_t(\theta_i, m) L_{fh}(\theta_i, m)$$
$$= \alpha \mu_t(\theta_i, m) L_0 f(\theta_i, m) h(\theta_i, m) \exp\left[ -\Delta \sum_{l=0}^{m} \mu_t(\theta_i, l) \right]$$

That is, the attenuation of the incident light in the tissue is mainly caused by absorption and backscattering, and the irradiance of the backscattered light is expressed as the above formula assuming that the light attenuation coefficient and the backscattered coefficient of the tissue have a linear relationship.

S1043: an irradiance of the backscattered light reaching a detector surface at the polar coordinate ($\theta_i$, m) is determined by using a formula:

$$A(\theta_i, m) = B(\theta_i, m)\exp\left[-\Delta\sum_{i=0}^{m}\mu_t(\theta_i, l)\right]$$

$$= \alpha\mu_t(\theta_i, m)L_0 f(\theta_i, m)h(\theta_i, m)\exp\left[-2\Delta\sum_{i=0}^{m}\mu_t(\theta_i, l)\right]$$

S1044: the theoretical value of the backscattered signal at the polar coordinate ($\theta_i$, m) is determined by using a formula:

$$I_b(\theta_i, m) = n(\theta_i, m) + \beta A(\theta_i, m)$$
$$= n(\theta_i, m) + \beta\alpha\mu_t(\theta_i, m)L_0 f(\theta_i, m)h(\theta_i, m)\exp\left[-2\Delta\sum_{i=0}^{m}\mu_t(\theta_i, l)\right]$$

i.e. taking into account an influence of noise.

Wherein, $L_{fn}(\theta_i, m)$ is the irradiance of the incident light at the polar coordinate ($\theta_i$, m) in an imaging plane, $L_0$ is an incident light power (unit: mW or dBm), $\mu t(\theta i, l)$ is a tissue light attenuation coefficient at the polar coordinate ($\theta i$, l), $B(\theta_i, m)$ is the irradiance of the backscattered light at the polar coordinate ($\theta_i$, m), $\alpha$ is a proportion of the backscattered light in the incident light, $A(\theta_i, m)$ is the irradiance of the backscattered light reaching the detector surface at the polar coordinate ($\theta_i$, m), $I_b(\theta_i, m)$ is the theoretical value of the backscattered signal at the polar coordinate ($\theta_i$, m), $n(\theta_i, m)$ is a noise power value introduced by measurement at the polar coordinate ($\theta_i$, m), and $\beta$ is an A/D conversion factor of the imaging system.

S105, a measured value of the backscattered signal is determined according to a gray value of each pixel in the grayed intravascular optical coherence tomography cross-sectional image.

Step S105 specifically includes:
determining a normalized measured value of the backscattered signal at a polar coordinate ($\theta_i$, m) by using a formula:

$$I_m(\theta_i, m) = \frac{g(\theta_i, m)}{255}.$$

Wherein, $g(\theta_i, m)$ is a gray value at the polar coordinate ($\theta_i$, m) in the polar coordinate view of an intravascular optical coherence tomography image, and $I_m(\theta_i, m)$ is the normalized measured value of the backscattered signal at the polar coordinate ($\theta_i$, M).

S106, an error function is constructed according to the theoretical value of the backscattered signal and the measured value of the backscattered signal corresponding to each polar coordinate.

Step S106 specifically includes:
determining the or function by using a formula: $f(\mu_t(\theta_i, m)) = I_b(\theta_i, m) - I_m(\theta_i, m)$.

Wherein, $f(\cdot)$ is the error function, $I_b(\theta_i, m)$ is a normalized theoretical value of the backscattered signal at a polar coordinates ($\theta_i$, M).

S107, the error function is minimized to determine a light attenuation coefficient corresponding to each polar coordinate in the polar coordinate view.

Step S107 specifically includes the following steps S1071-1074:

S1071: an estimated value of the light attenuation coefficient is determined by using a formula:

$$\hat{\mu}_t(\theta_i, m) = \underset{\mu \geq 0}{\mathrm{argmin}} F(\mu) = \underset{\mu \geq 0}{\mathrm{argmin}} \|f(\mu)\|^2.$$

S1072: Taylor expansion approximation is performed on an objective function $F(\mu)$ near $\mu$ by using a formula:
$$F(\mu+\Delta\mu) = \|f(\mu+\Delta\mu)\|^2 \approx \|f(\mu)\|^2 + f'(\mu)\Delta\mu + \tfrac{1}{2}f''(\mu)(\Delta\mu)^2.$$

S1073: an optimization of the estimated value of the light attenuation coefficient is converted into solving an optimal increment $\Delta\mu$ for each iteration by using a formula:

$$\begin{cases} \Delta\hat{\mu} = \underset{\Delta\mu}{\mathrm{argmin}}\, m(\Delta\mu) \\ m(\Delta\mu) = \|f(\mu)\|^2 + f'(\mu)\Delta\mu + \frac{1}{2}f''(\mu)(\Delta\mu)^2 + \frac{1}{2}\gamma(\Delta\mu)^2 \end{cases},$$

and a damping term is added to punish $\Delta\mu$;

S1074: a formula:

$$\begin{cases} \Delta\hat{\mu} = \underset{\Delta\mu}{\mathrm{arg\,min}}\, m(\Delta\mu) \\ m(\Delta\mu) = \|f(\mu)\|^2 + f'(\mu)\Delta\mu + \frac{1}{2}f''(\mu)(\Delta\mu)^2 + \frac{1}{2}\gamma(\Delta\mu)^2 \end{cases}$$

is solved, to determine the light attenuation coefficient corresponding to each polar coordinate in the polar coordinate view.

Wherein, $F(\mu)$ is an objective function, $\hat{\mu}_t(\theta_i, m)$ is the estimated value of the light attenuation coefficient, $f'(\mu)$ and $f''(\mu)$ are the first and second derivatives of $f(\mu)$ respectively.

Figure 4:
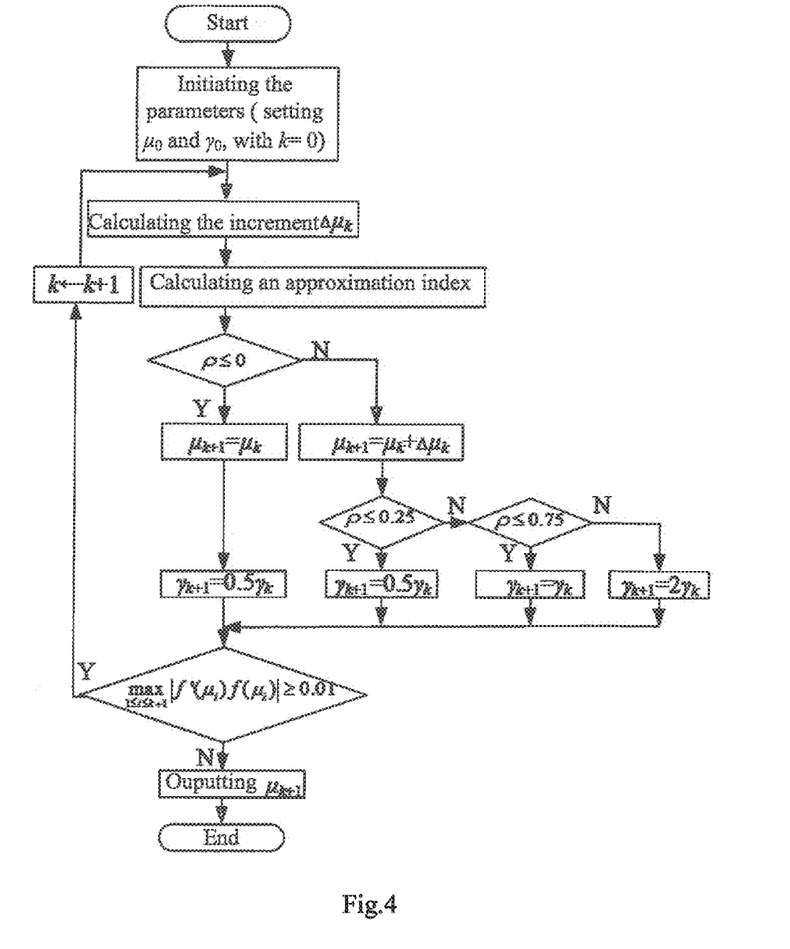
FIG. 4 is a schematic flow chart of an algorithm minimizing an error function.

As shown in FIG. 4, the process for solving the formula:

$$\begin{cases} \Delta\hat{\mu} = \underset{\Delta\mu}{\mathrm{arg\,min}}\, m(\Delta\mu) \\ m(\Delta\mu) = \|f(\mu)\|^2 + f'(\mu)\Delta\mu + \frac{1}{2}f''(\mu)(\Delta\mu)^2 + \frac{1}{2}\gamma(\Delta\mu)^2 \end{cases}$$

includes following step 1 to step 4.

Step 1: the parameters is initialized, i.e. an initial iteration value $\mu_0$ and an initial damping coefficient value $\gamma_0$ are set, and the iteration number k is set to be 0.

Step 2: let m'($\Delta\mu$)=0, and the following formula is obtained:

$$f'(\mu_k) + f''(\mu_k)\Delta\mu_k + \gamma_k\Delta\mu_k = 0.$$

A minimum value of m($\Delta\mu$) is solved, where pa is the light attenuation coefficient at the polar coordinate ($\theta_i$, m) after the $k^{th}$ iteration, $\Delta\mu_k$ is the increment of $\mu_k$, $f'(\mu_k)$ and $f''(\mu_k)$ are the first and second derivatives of $f(\mu_k)$ respectively, and $\gamma_k$ is the damping coefficient after the $k^{th}$ iteration.

The increment is solved according to the following formula:

$$\Delta\mu_k = -[f''(\mu_k)+\gamma_k]^{-1}f'(\mu_k).$$

Step 3: an approximation index ρ representing a similarity degree between the linear approximation and the real objective function is calculated:

$$\rho = \frac{F(\mu_k + \Delta\mu_k) - F(\mu_k)}{f'(\mu_k)\Delta\mu_k + \frac{1}{2}f''(\mu_k)(\Delta\mu_k)^2 + \frac{1}{2}\gamma_k(\Delta\mu_k)^2}.$$

Step 4: the damping coefficient is adjusted according to ρ:

(1) If ρ≤0, i.e., the variation trend of the error being opposite to the optimization objective, which indicates a poor linear approximation, let $\mu_{k+1}=\mu_k$, and decrease the damping coefficient, i.e., let $\gamma_{k+1}=0.5\gamma_k$, and then go to step 5.

(2) If ρ>0, i.e. the variation trend of the error being the same as the optimization objective, which indicates that the linear approximation is good at this time and an iterative update should be performed, let $\mu_{k+1}=\mu_k+\Delta\mu_k$. If 0<ρ≤0.25, reduce the damping coefficient, i.e. let $\gamma_{k+1}=0.5\gamma_k$. If 0.25<ρ≤0.75, keep the damping unchanged, i.e. let $\gamma_{k+1}=\gamma_k$. If ρ>0.75, increase the damping coefficient, i.e., let $\gamma_{k+1}=2\gamma_k$.

Step 5: It is determined whether the iteration is terminated according to the following formula:

$$\max_{1\leq i\leq k+1} |f'(\mu_i)f(\mu_i)| \geq 0.01.$$

If the above formula is satisfied, turn to step 6; otherwise, the iteration is terminated, aid the estimation result $\mu_{k+1}$ of the light attenuation coefficient is output.

Step 6: the iteration times is updated, and let k to be k+1, and turn to step 2.

S108, a spatial distribution diagram of the light attenuation coefficient is determined according to the light attenuation coefficient corresponding to each polar coordinate in the polar coordinate view.

S108 specifically includes:

normalizing and graying the polar coordinate view, and converting it into a rectangular coordinate view, namely a lateral view after the light attenuation coefficient corresponding to each polar coordinate in the polar coordinate view is obtained.

Figure 5:
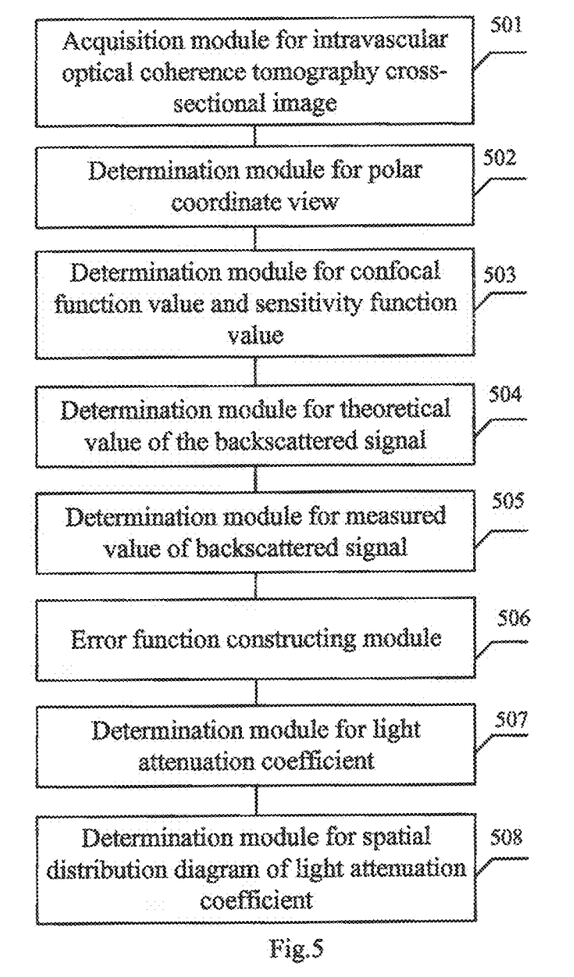
FIG. 5 is a schematic structural diagram of a system of quantitative intravascular optical coherence tomography provided by the present disclosure.

FIG. 5 is a schematic structural diagram of a system of quantitative intravascular optical coherence tomography provided by the present disclosure. As shown in FIG. 5, the system of quantitative intravascular optical coherence tomography provided by the present disclosure may include: an acquisition module 301 for intravascular optical coherence tomography cross-sectional image, a determination module 502 for a polar coordinate view, a determination module 503 for a confocal function value and a sensitivity function value, a determination module 504 for a theoretical value of the backscattered signal, a determination module 505 for a measured value of the backscattered signal, an error function constructing module 506, a determination module 307 for a light attenuation coefficient and a determination module 508 for a spatial distribution diagram of the light attenuation coefficient.

The acquisition module 501 for the intravascular optical coherence tomography cross-sectional image is configured to acquire an intravascular optical coherence tomography cross-sectional image output by an imaging system. Wherein, the intravascular optical coherence tomography cross-sectional image is a lateral view; a center of the intravascular optical coherence tomography cross-sectional image corresponds to a center of an imaging catheter, and a vascular lumen, a vascular wall intima/media and a vascular wall adventitia are around the center of the image in sequence.

The determination module 502 for the polar coordinate view is configured to gray the intravascular optical coherence tomography cross-sectional image, and convert the grayed intravascular optical coherence tomography cross-sectional image into a polar coordinate view.

The determination module 503 for the confocal function value and the sensitivity function value is configured to respectively calculate the confocal function value and the sensitivity function value of each polar coordinate in the polar coordinate view according to parameters of the imaging system. Wherein, the parameters of the imaging system comprise: a center wavelength of an incident light, a resolution of a spectrometer, and a wavelength interval.

The determination module 504 for the theoretical value of the backscattered signal is configured to establish a model of the intensity of the backscattered signal being attenuated depending on the detection depth, according to the confocal function value and the sensitivity function value of each polar coordinate to obtain a theoretical value of the backscattered signal.

The determination module 505 for the measured value of the backscattered signal is configured to determine the measured value of the backscattered signal according to a gray value of each pixel in the grayed intravascular optical coherence tomography cross-sectional image.

The error function constructing module 506 is configured to construct an error function according to the theoretical value of the backscattered signal and the measured value of the backscattered signal corresponding to each polar coordinate.

The determination module 507 for the light attenuation coefficient is configured to minimize the error function to determine a light attenuation coefficient corresponding to each polar coordinate in the polar coordinate view.

The determination module 508 for the spatial distribution diagram of the light attenuation coefficient is configured to determine the spatial distribution diagram of the light attenuation coefficient according to the light attenuation coefficient corresponding to each polar coordinate in the polar coordinate view.

The embodiments in the present specification am described in a progressive manner, each embodiment focuses on differences from other embodiments, and the same and similar parts among the embodiments are referred to each other. The system disclosed by the embodiment corresponds to the method disclosed by the embodiment and thus is briefly described, and the relevant parts can refer to the portion of the method.

The principles and implementation of the present disclosure have been described herein with specific examples, and the above embodiments are presented to aid in the understanding of the methods and core concepts of the present disclosure; meanwhile, those skilled in the art may make some changes in both the detailed description and an application scope according to the teachings of this disclosure. In conclusion, the contents of the description should not be construed as limiting the disclosure.

What is claimed:

1. A method of quantitative intravascular optical coherence tomography, comprising:
   acquiring an intravascular optical coherence tomography cross-sectional image output by an imaging system; wherein, the intravascular optical coherence tomography cross-sectional image is a transverse view; a center of the intravascular optical coherence tomography cross-sectional image corresponds to a center of an imaging catheter, and a vascular lumen surrounds the center of the image, a vascular wall intima/media surrounds the vascular lumen, and a vascular wall adventitia surrounds the vascular wall intima/media;
   graying the intravascular optical coherence tomography cross-sectional image, and converting the grayed intravascular optical coherence tomography cross-sectional image into a polar coordinate view;
   respectively calculating a confocal function value and a sensitivity function value of each polar coordinate in the polar coordinate view according to parameters of the imaging system; wherein, the parameters of the imaging system comprise: a center wavelength of an incident light, a resolution of a spectrometer, and a wavelength interval;
   establishing a model of an intensity of a backscattered signal being attenuated depending on a detection depth, according to the confocal function value and the sensitivity function value of each polar coordinate to obtain a theoretical value of the backscattered signal;
   determining a measured value of the backscattered signal according to a gray value of each pixel in the grayed intravascular optical coherence tomography cross-sectional image;
   constructing an error function according to the theoretical value of the backscattered signal and the measured value of the backscattered signal corresponding to each polar coordinate;
   minimizing the error function to determine a light attenuation coefficient corresponding to each polar coordinate in the polar coordinate view; and
   determining a spatial distribution diagram of the light attenuation coefficient according to the light attenuation coefficient corresponding to each polar coordinate in the polar coordinate view,
   wherein respectively calculating the confocal function value and the sensitivity function value of each polar coordinate in the polar coordinate view according to the parameters of the imaging system comprises:
   determining the confocal function value at a polar coordinate $(\theta_i, m)$ by using a formula:

$$h(\theta_i, m) = \int_{m\Delta}^{(m+1)\Delta} \left\{ \left[ \frac{\lambda_0(z-z_0)}{\alpha_R n\pi w_0^2} \right]^2 + 1 \right\}^{-1} dz;$$

determining the sensitivity function value at the polar coordinate $(\theta_i, m)$ by using a formula:

$$f(\theta_i, m) = \int_{m\Delta}^{(m+1)\Delta} \left[ \left( \frac{\sin\zeta}{\zeta} \right)^2 \exp\left( -\frac{\delta\lambda/\Delta\lambda}{2\ln 2} \zeta^2 \right) \right] dz;$$

wherein $h(\theta_i, m)$ is the confocal function value at the polar coordinate $(\theta_i, m)$, $f(\theta_i, m)$ is the sensitivity function value at the polar coordinate $(\theta_i, m)$, $\theta \in [0, 2\pi]$, $m = 0, 1, \ldots, M$, M is the radius (unit: pixel) of a frame of the intravascular optical coherence tomography cross-sectional image, $\Delta$ is a size (unit: mm) of the pixel in the image, $\alpha$ is a derivative parameter of a secondary laser beam formed by an interaction of an incident beam with scatterers in a medium ($\alpha_R=1$ for a specular reflection; and $\alpha_R=2$ for a diffuse reflection), n is a refractive index of a tissue to light, $z_0$ is a focal plane position ($z_0$ is negative when the focal plane is above the tissue, $z_0$ is positive when the focal plane is inside the tissue), $w_0$ is a light spot radius after the incident light is focused $\lambda_0$ is the enter wavelength of the incident light, $\delta\lambda$ is the resolution of the spectrometer, $\Delta\lambda$ is the wavelength interval, $\lambda_0$, $\delta\lambda$ and $\Delta\lambda$ are the parameters of the imaging system, $\zeta$ is a normalized value of a depth z with respect to a maximum detection depth, wherein $$\zeta = 2\pi z \frac{\Delta\lambda}{\lambda_0^2}.$$

2. The method according to claim 1, wherein graying the intravascular optical coherence tomography cross-sectional image, and converting the grayed intravascular optical coherence tomography cross-sectional image into the polar coordinate view comprises:
   graying the intravascular optical coherence tomography cross-sectional image to determine the grayed intravascular optical coherence tomography cross-sectional image;
   establishing an XOY rectangular coordinate system with a center of the imaging catheter as a coordinate origin O, the horizontal right direction as a positive direction of an X-axis, and an upward vertical direction as a positive direction of a Y-axis, according to the grayed intravascular optical coherence tomography cross-sectional image;
   establishing a θ-l polar coordinate system with O as a coordinate origin according to the XOY rectangular coordinate system, and converting the grayed intravascular optical coherence tomography cross-sectional image into a polar coordinate view; wherein θ is a polar angle, l is a polar diameter, l-axis is a radial thickness of a multilayered vascular wall tissue, and a surface of the vascular wall is parallel to θ-axis and perpendicular to the l-axis.

3. The method according to claim 1, wherein establishing the model of the intensity of the backscattered signal being attenuated depending on the detection depth, according to the confocal function value and the sensitivity function value of each polar coordinate to obtain the theoretical value of the backscattered signal comprises:
   determining an irradiance of the incident light at the polar coordinate $(\theta_i, m)$ by using a formula:

$$L_{fh}(\theta_i, m) = L_0 f(\theta_i, m) h(\theta_i, m) \exp\left[ -\Delta \sum_{i=0}^{m} \mu_i(\theta_i, l) \right];$$

determining an irradiance of the backscattered light at the polar coordinate ($\theta_i$, m) by using a formula:

$$B(\theta_i, m) = \alpha\mu_t(\theta_i, m)L_{fh}(\theta_i, m)$$
$$= \alpha\mu_t(\theta_i, m)L_0 f(\theta_i, m)h(\theta_i, m)\exp\left[-\Delta\sum_{l=0}^{m}\mu_t(\theta_i, l)\right];$$

determining an irradiance of the backscattered light reaching a detector surface at the polar coordinate ($\theta_i$, m) by using a formula:

$$A(\theta_i, m) = B(\theta_i, m)\exp\left[-\Delta\sum_{l=0}^{m}\mu_t(\theta_i, l)\right]$$
$$= \alpha\mu_t(\theta_i, m)L_0 f(\theta_i, m)h(\theta_i, m)\exp\left[-2\Delta\sum_{l=0}^{m}\mu_t(\theta_i, l)\right];$$

and
determining the theoretical value of the backscattered signal at the polar coordinate ($\theta_i$, m) by using a formula:

$$I_b(\theta_i, m) = n(\theta_i, m) + \beta A(\theta_i, m)$$
$$= n(\theta_i, m) + \beta\alpha\mu_t(\theta_i, m)L_0 f(\theta_i, m)$$
$$h(\theta_i, m)\exp\left[-2\Delta\sum_{l=0}^{m}\mu_t(\theta_i, l)\right];$$

wherein, $L_{fh}(\theta_i, m)$ is the irradiance of the incident light at the polar coordinate ($\theta_i$, m) in an imaging plane, $L_0$ is an incident light power (unit: mW or dBm), $\mu_t(\theta_i, l)$ is a tissue light attenuation coefficient at the polar coordinate ($\theta_i$, l), $B(\theta_i, m)$ is the irradiance of the backscattered light at the polar coordinate ($\theta_i$, m), $\alpha$ is a proportion of the backscattered light in the incident light, $A(\theta_i, m)$ is the irradiance of the backscattered light reaching the detector surface at the polar coordinate ($\theta_i$, m), $I_b(\theta_i, m)$ is the theoretical value of the backscattered signal at the polar coordinate ($\theta_i$, m), $n(\theta_i, m)$ is a noise power value introduced by measurement at the polar coordinate ($\theta_i$, m), and $\beta$ is an A/D conversion factor of the imaging system.

4. The method according to claim 1, wherein determining the measured value of the backscattered signal according to the gray value of each pixel in the grayed intravascular optical coherence tomography cross-sectional image comprises:
determining a normalized measured value of the backscattered signal at a polar coordinate ($\theta_i$, m) by using a formula:

$$I_m(\theta_i, m) = \frac{g(\theta_i, m)}{255};$$

wherein, $g(\theta_i, m)$ is a gray value at the polar coordinate ($\theta_i$, m) in the polar coordinate view of an intravascular optical coherence tomography image, and $I_m(\theta_i, m)$ is the normalized measured value of the backscattered signal at the polar coordinate ($\theta_i$, m).

5. The method according to claim 1, wherein constructing the error function according to the theoretical value of the backscattered signal and the measured value of the backscattered signal corresponding to each polar coordinate comprises:
determining the error function by using a formula:

$$f(\mu_t(\theta_i, m)) = \bar{I}_b(\theta_i, m) - I_m(\theta_i, m);$$

wherein, f(·) is the error function, $\bar{I}_b(\theta_i, m)$ is a normalized theoretical value of the backscattered signal at a polar coordinates ($\theta_i$, m).

6. The method according to claim 1, wherein minimizing the error function to determine the light attenuation coefficient corresponding to each polar coordinate in the polar coordinate view comprises:
determining an estimated value of the light attenuation coefficient by using a formula:

$$\hat{\mu}_t(\theta_i, m) = \underset{\mu \geq 0}{\arg\min} F(\mu) = \underset{\mu \geq 0}{\arg\min}\|f(\mu)\|^2;$$

performing Taylor expansion approximation on an objective function F($\mu$) near $\mu$ by using a formula:

$$F(\mu+\Delta\mu) = \|f(\mu+\Delta\mu)\|^2 \approx \|f(\mu)\|^2 + f'(\mu)\Delta\mu + \tfrac{1}{2}f''(\mu)(\Delta\mu)^2;$$

converting an optimization problem of the an estimated value of the light attenuation coefficient into solving an optimal increment $\Delta\mu$ for each iteration by using a formula as follows, and adding a damping term to punish $\Delta\mu$:

$$\begin{cases}\Delta\hat{\mu} = \underset{\Delta\mu}{\arg\min}\, m(\Delta\mu)\\ m(\Delta\mu) = \|f(\mu)\|^2 + f'(\mu)\Delta\mu + \frac{1}{2}f''(\mu)(\Delta\mu)^2 + \frac{1}{2}\gamma(\Delta\mu)^2\end{cases};$$

and
solving a formula:

$$\begin{cases}\Delta\hat{\mu} = \underset{\Delta\mu}{\arg\min}\, m(\Delta\mu)\\ m(\Delta\mu) = \|f(\mu)\|^2 + f'(\mu)\Delta\mu + \frac{1}{2}f''(\mu)(\Delta\mu)^2 + \frac{1}{2}\gamma(\Delta\mu)^2\end{cases},$$

to determine the light attenuation coefficient corresponding to each polar coordinate in the polar coordinate;
wherein, F($\mu$) is the objective function, $\hat{\mu}_t(\theta_i, m)$ is the estimated value of the light attenuation coefficient, f'($\mu$) and f''($\mu$) are a first derivative and a second derivative of f($\mu$) respectively.

7. A system of quantitative intravascular optical coherence tomography, comprising:
an acquisition module for intravascular optical coherence tomography cross-sectional image, configured to acquire an intravascular optical coherence tomography cross-sectional image output by an imaging system; wherein, the intravascular optical coherence tomography cross-sectional image is a transverse view; a center of the intravascular optical coherence tomography cross-sectional image corresponds to a center of an imaging catheter, and a vascular lumen surrounds the center of the image, a vascular wall intima/media surrounds the vascular lumen, and a vascular wall adventitia surrounds the vascular wall intima/media;

a determination module for a polar coordinate view, configured to gray the intravascular optical coherence tomography cross-sectional image, and convert the grayed intravascular optical coherence tomography cross-sectional image into a polar coordinate view;

a determination module for a confocal function value and a sensitivity function value, configured to respectively calculate the confocal function value and the sensitivity function value of each polar coordinate in the polar coordinate view according to parameters of the imaging system; wherein, the parameters of the imaging system comprise: a center wavelength of the incident light, a resolution of a spectrometer, and a WA wavelength interval;

a determination module for a theoretical value of the backscattered signal, configured to establish a model of the intensity of the backscattered signal being attenuated depending on a detection depth, according to the confocal function value and the sensitivity function value of each polar coordinate to obtain the theoretical value of the backscattered signal;

a determination module for a measured value of the backscattered signal, configured to determine the measured value of the backscattered signal according to a gray value of each pixel in the grayed intravascular optical coherence tomography cross-sectional image;

an error function construction module, configured to construct an error function according to the theoretical value of the backscattered signal and the measured value of the backscattered signal corresponding to each polar coordinate;

a determination module for a light attenuation coefficient, configured to minimize the error function to determine the light attenuating coefficient corresponding to each polar coordinate in the polar coordinate view; and a determination module for a spatial distribution diagram of the light attenuation coefficient, configured to determine the spatial distribution diagram of the light attenuation coffined according to the light attenuation coefficient corresponding to each polar coordinate in the polar coordinate view, wherein respectively calculating the confocal function value and the sensitivity function value of each polar coordinate in the polar coordinate view according to the parameters of the imaging system comprises:

determining the confocal function value at a polar coordinate ($\theta_i$, m) by using a formula:

$$h(\theta_i, m) = \int_{m\Delta}^{(m+1)\Delta} \left\{ \left[ \frac{\lambda_0(z-z_0)}{\alpha_R n \pi w_0^2} \right]^2 + 1 \right\}^{-1} dz;$$

determining the sensitivity function value at the polar coordinate ($\theta_i$, m) by using a formula:

$$f(\theta_i, m) = \int_{m\Delta}^{(m+1)\Delta} \left[ \left( \frac{\sin\zeta}{\zeta} \right)^2 \exp\left( -\frac{\delta\lambda/\Delta\lambda}{2\ln2} \zeta^2 \right) \right] dz;$$

wherein h($\theta_i$, m) is the confocal function value at the polar coordinate ($\theta_i$, m), f($\theta_i$, m) is the sensitivity function value at the polar coordinate ($\theta_i$, m), $\theta \in [0, 2\pi]$, m=0, 1, . . . , M, M is the radius (unit: pixel) of a frame of the intravascular optical coherence tomography cross-sectional image, $\Delta$ is a size (unit: mm) of the pixel in the image, $\alpha$ is a derivative parameter of a secondary laser beam formed by an interaction of an incident beam with scatterers in a medium ($\alpha_R$=1 for a specular reflection; and $\alpha_R$=2 for a diffuse reflection), n is a refractive index of a tissue to light, $z_0$ is a focal plane position ($z_0$ is negative when the focal plane is above the tissue, $z_0$ is positive when the focal plane is inside the tissue), $w_0$ is a light spot radius after the incident light is focused $\lambda_0$ is the enter wavelength of the incident light, $\delta\lambda$ is the resolution of the spectrometer, $\Delta\lambda$ is the wavelength interval, $\lambda_0$, $\delta\lambda$ and $\Delta\lambda$ are the parameters of the imaging system, $\zeta$ is a normalized value of a depth z with respect to a maximum detection depth, wherein $$\zeta = 2\pi z \frac{\Delta\lambda}{\lambda_0^2}.$$

* * * * *